March 30, 1954 — C. M. MOORE — 2,673,659
DEMOUNTABLE STRUCTURE
Filed June 13, 1950 — 8 Sheets-Sheet 1
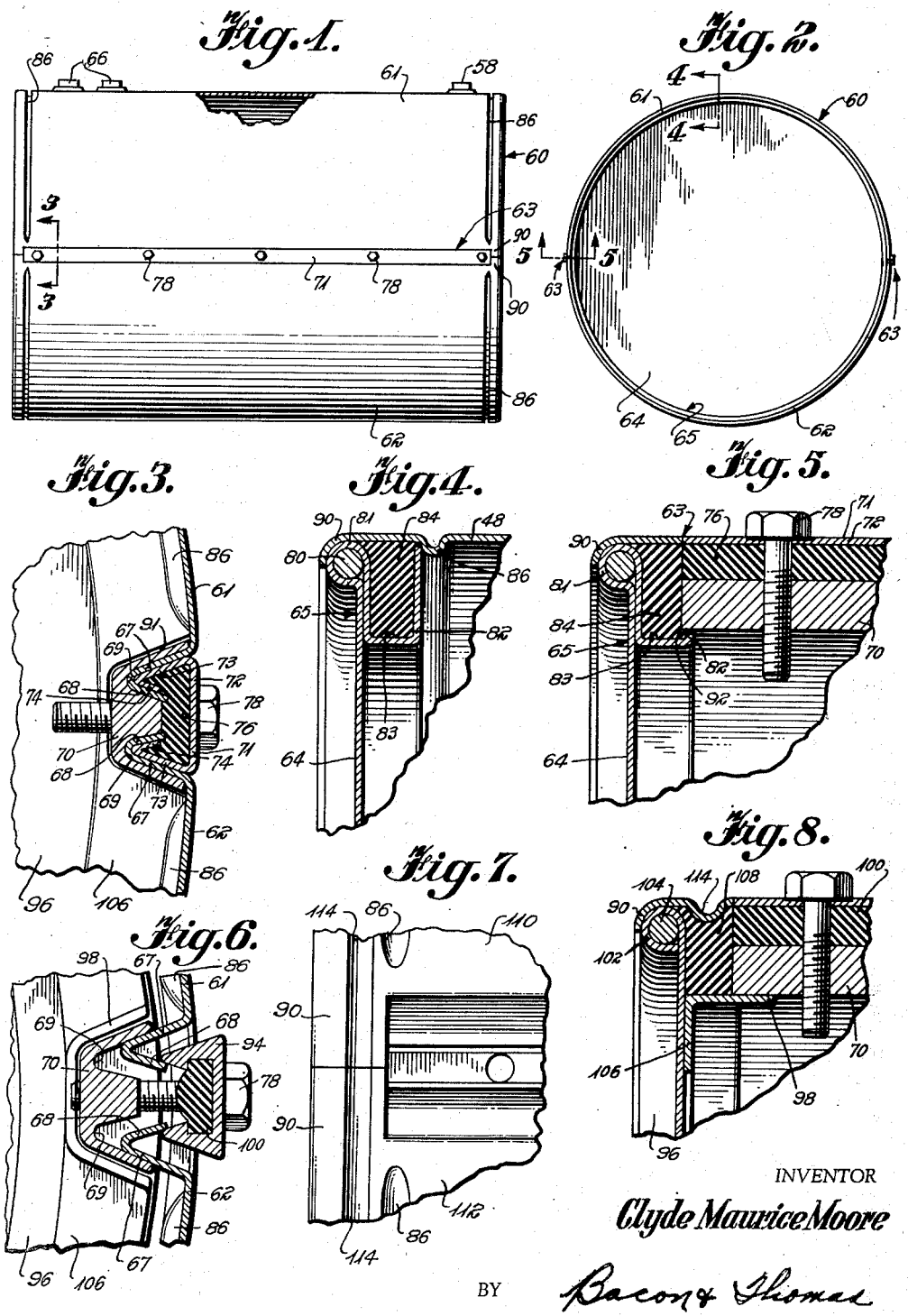
INVENTOR
Clyde Maurice Moore
BY Bacon & Thomas
ATTORNEYS

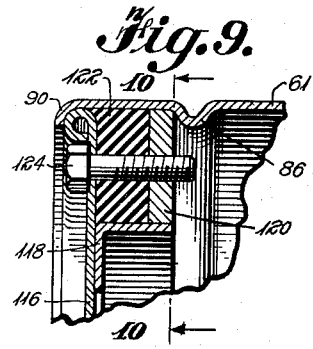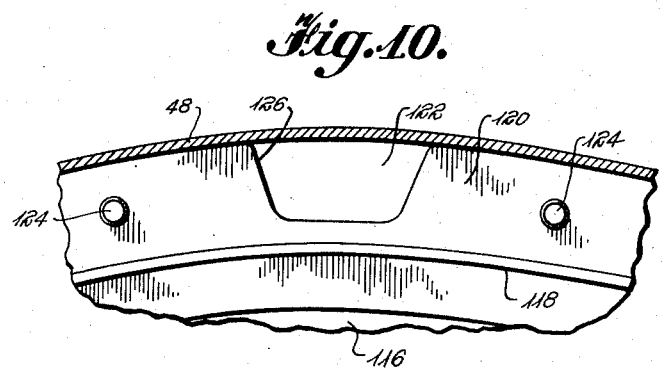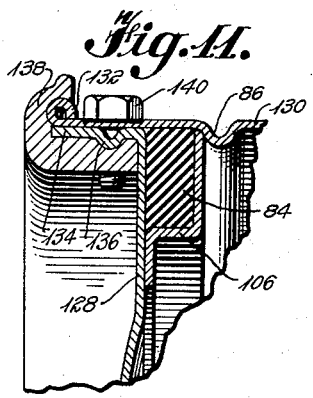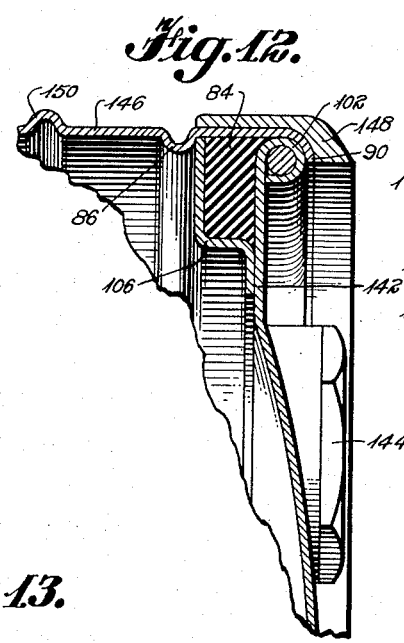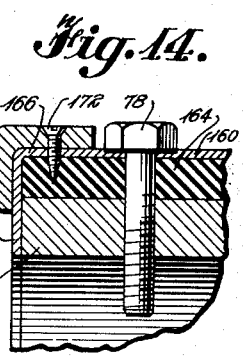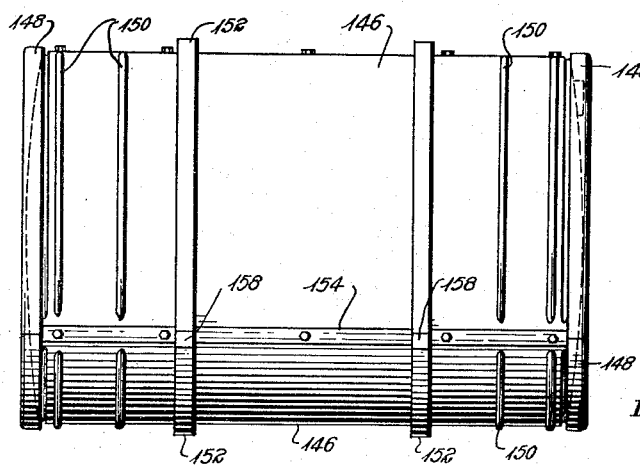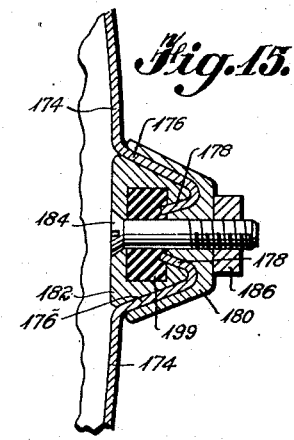

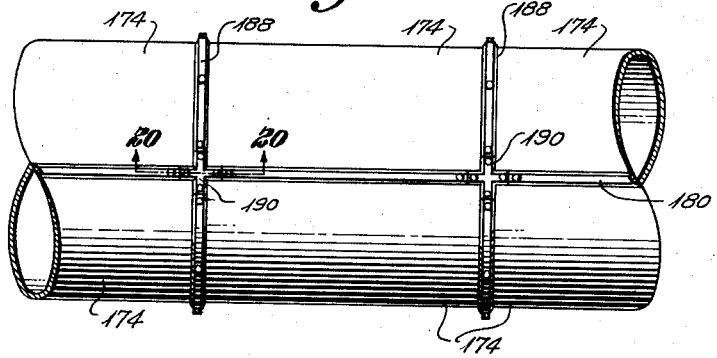
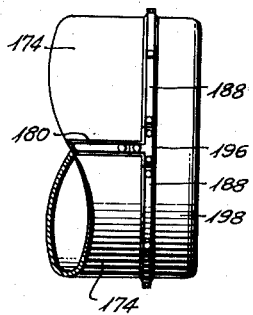
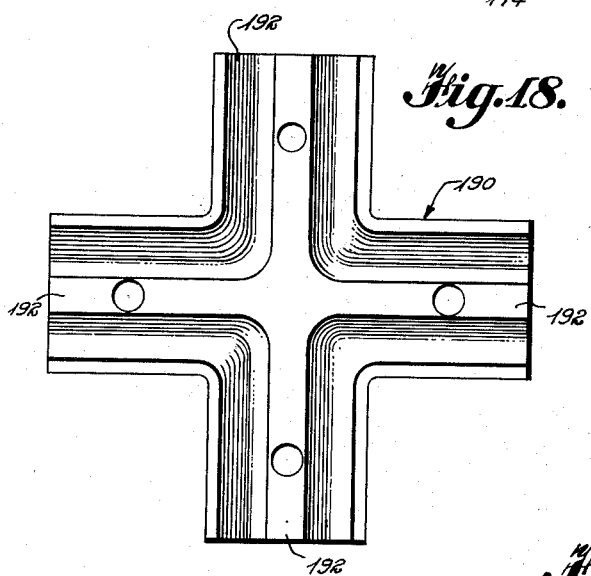
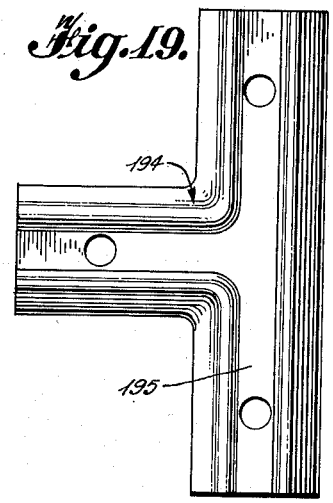
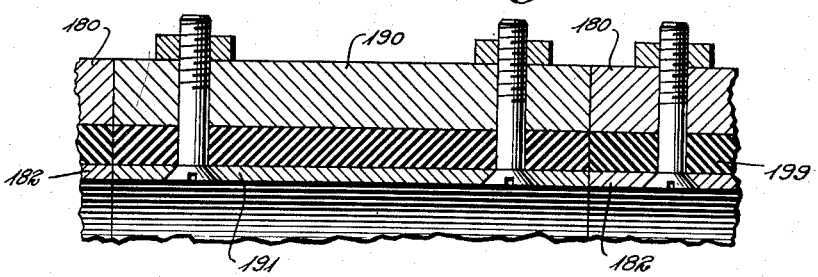
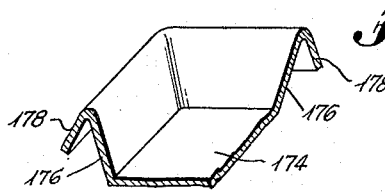

March 30, 1954     C. M. MOORE     2,673,659
DEMOUNTABLE STRUCTURE
Filed June 13, 1950     8 Sheets-Sheet 4
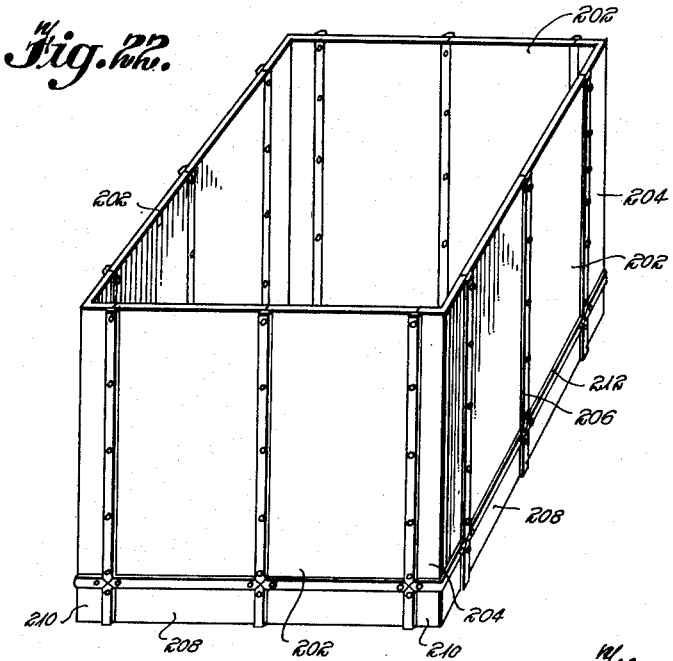
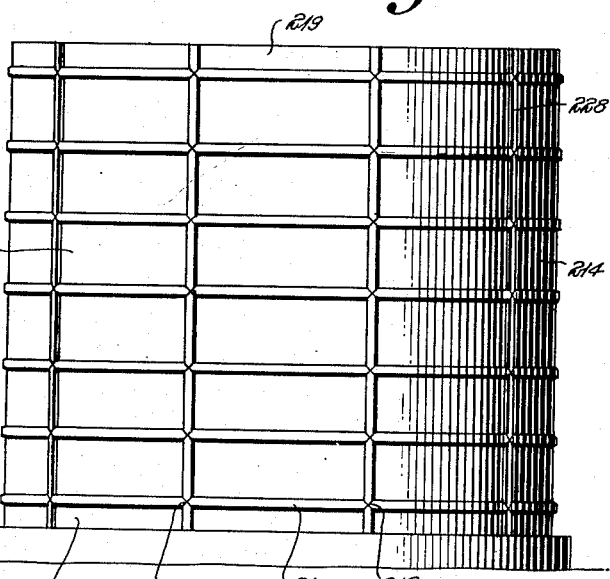
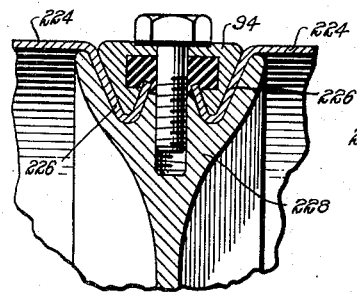
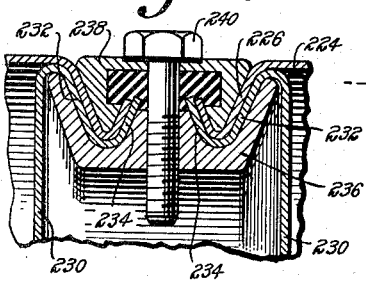
INVENTOR
Clyde Maurice Moore
BY Bacon & Thomas
ATTORNEYS March 30, 1954  C. M. MOORE  2,673,659
DEMOUNTABLE STRUCTURE
Filed June 13, 1950  8 Sheets-Sheet 5
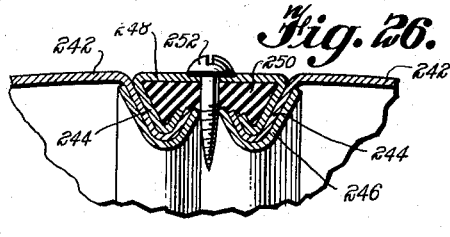
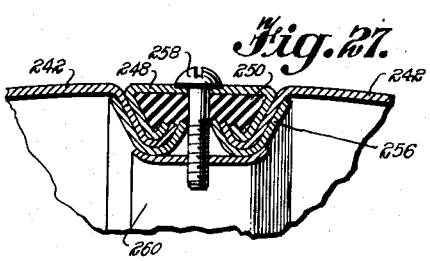
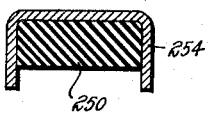
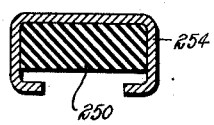
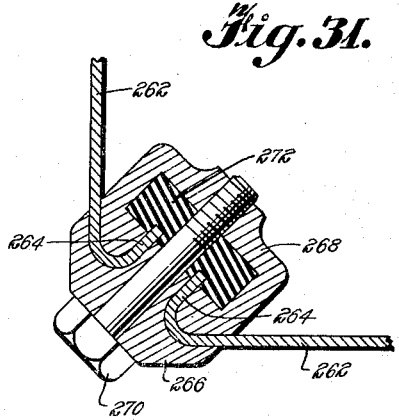
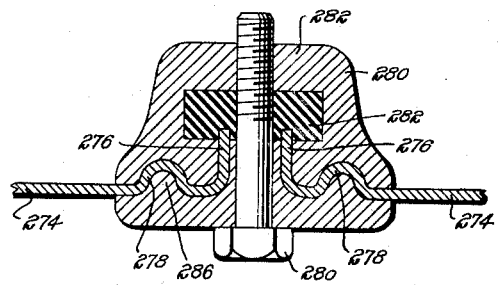
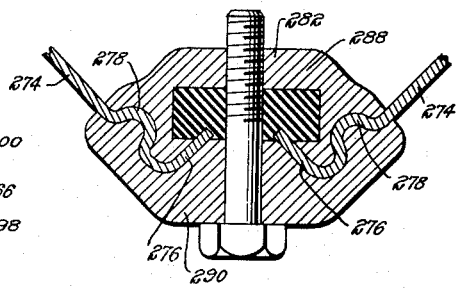
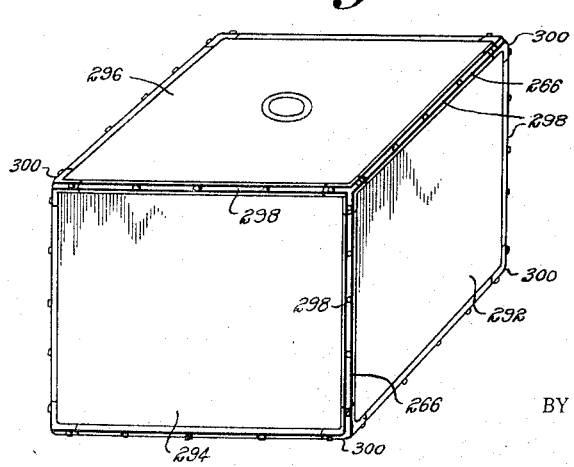
INVENTOR
Clyde Maurice Moore
BY Bacon & Thomas
ATTORNEYS March 30, 1954   C. M. MOORE   2,673,659
DEMOUNTABLE STRUCTURE
Filed June 13, 1950   8 Sheets-Sheet 6

INVENTOR
*Clyde Maurice Moore*
BY *Bacon & Thomas*
ATTORNEYS

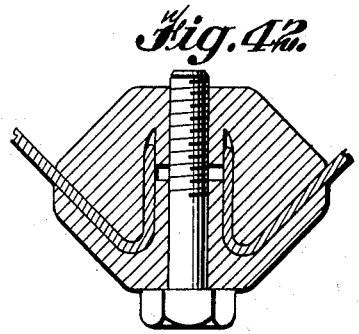
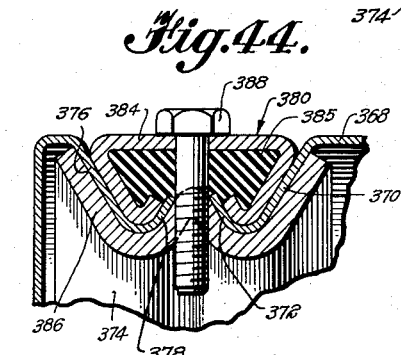
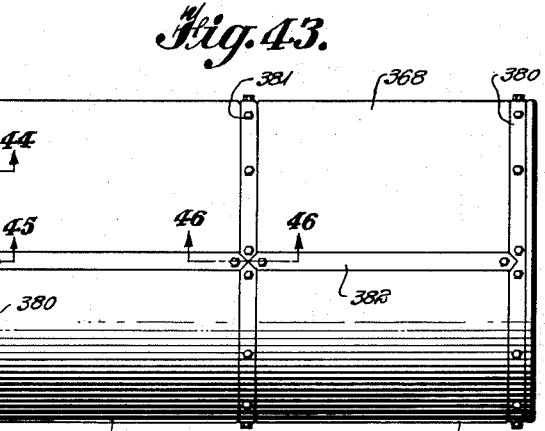
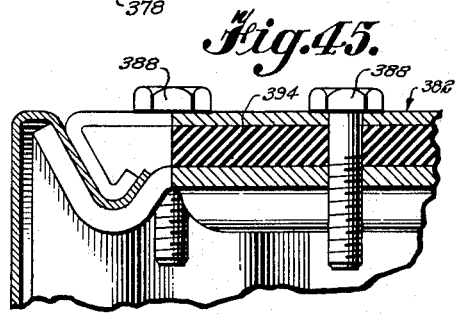
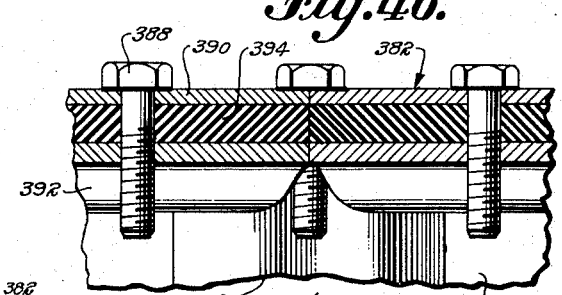
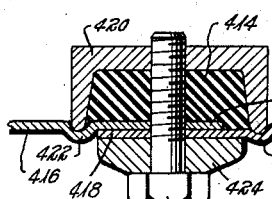
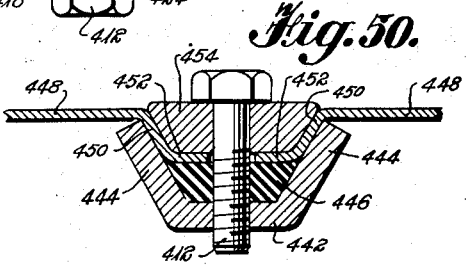
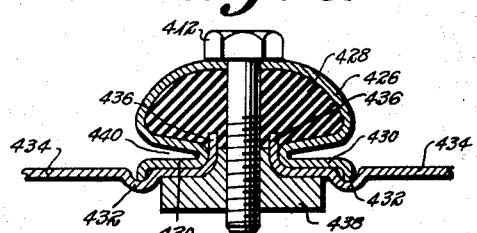

March 30, 1954 C. M. MOORE 2,673,659
DEMOUNTABLE STRUCTURE
Filed June 13, 1950 8 Sheets-Sheet 8
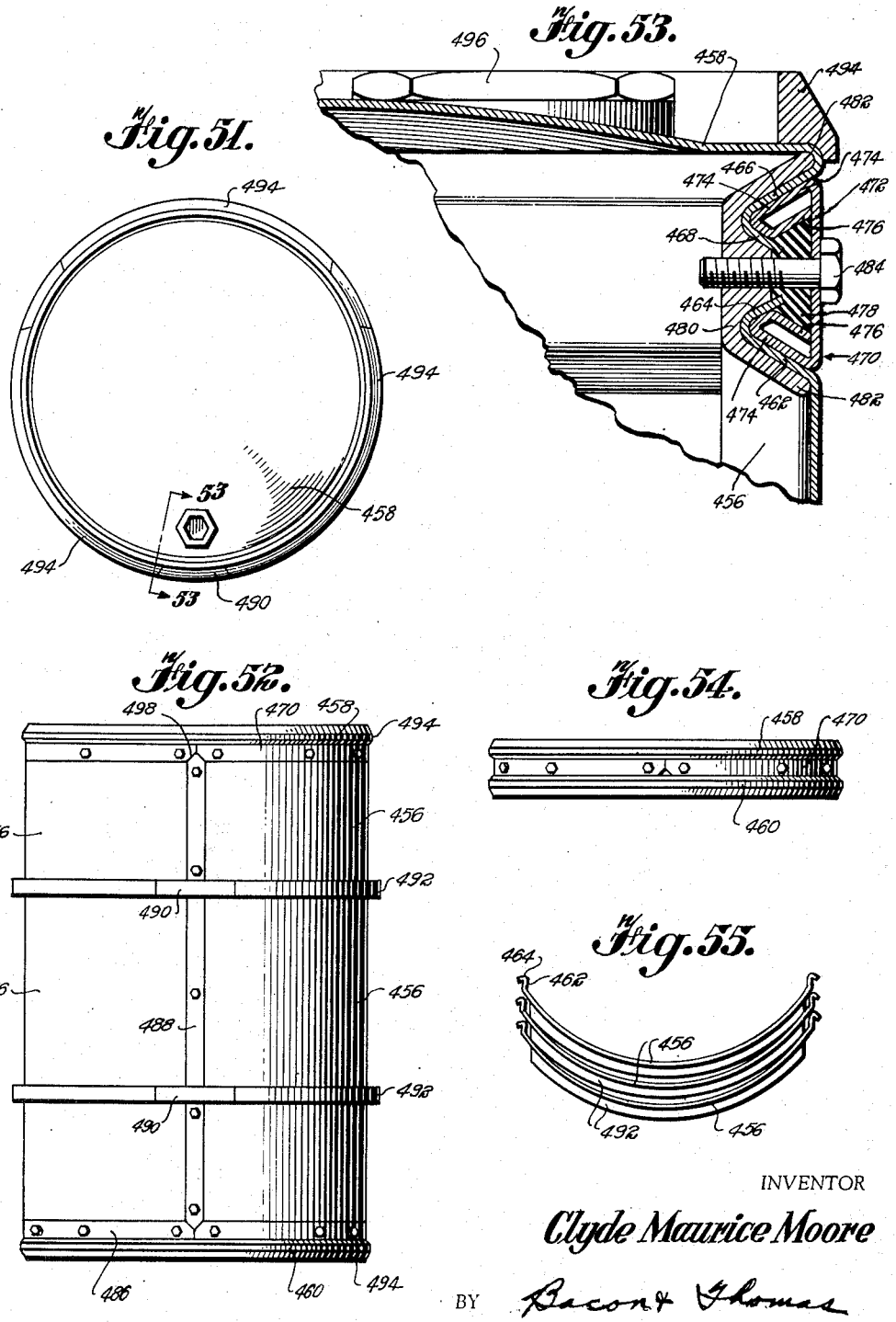
INVENTOR
Clyde Maurice Moore
BY Bacon & Thomas
ATTORNEYS Patented Mar. 30, 1954

2,673,659

UNITED STATES PATENT OFFICE 2,673,659

DEMOUNTABLE STRUCTURE

Clyde Maurice Moore, Richmond, Va., assignor to Moorex Industries, Inc., Richmond, Va., a corporation of Virginia Application June 13, 1950, Serial No. 167,793

6 Claims. (Cl. 220—80)

This invention relates to a demountable structure, and more particularly, to a container or analogous structure involving a novel sealing joint enabling the structure to be easily assembled and disassembled and shipped in sections while at the same time insuring that a leak proof receptacle or similar structure is produced when the container is assembled.

Many materials particularly liquids must be shipped in containers such as shipping drums which are proof against leakage of either liquids or gases. Such containers are expensive and if of relatively large size are customarily returned to the shipper. They occupy a large amount of space, both during the initial shipment from the container manufacturer to the user or during return shipment, after use. A simple demountable container made up of detachable parts so that it can be shipped in disassembled condition has, therefore, long been a desideratum. The difficulty of providing a demountable leak-proof container has, however, largely prevented the use of demountable shipping containers.

Also in shipping large containers, such as tanks, a large amount of space has been required and it has been desirable to ship such tanks in sections. It has been difficult to provide tanks which can be easily erected at the point of use with unskilled labor and a minimum amount of tools so as to provide leak proof structures and in most cases the art has continued to ship tanks after being fabricated to final form. Similar considerations apply to pipes of large size.

In accordance with the present invention I have provided a demountable structure whereby large sized shipping containers, tanks, storage bins, large sized pipes and analogous structures may be shipped in sections so as to occupy a minimum of space. The structures of the present invention can be easily assembled at the point of use to provide leak proof structures and in the case of shipping containers can be readily disassembled for return shipment. That is to say, shipping containers and analogous structures can be repeatedly disassembled and assembled into leak proof structures.

An important feature of the present invention is the provision of a novel joint structure which provides a continuous resilient seal extending throughout all of the various joints required for a demountable leak proof structure. The joint includes a resilient and flowable sealing material which extends continuously throughout all of the joints in the structure. The continuous sealing material may be and usually is made up of a plurality of flowable sealing elements extending into contact with each other so as to transmit pressure from one element to the others. The continuous seal is substantially completely surrounded by the metal or other material from which the structure is fabricated. That is to say, the flowable material forming the seal is confined within communicating closed channels or cavities in the structure and is placed under pressure analogous to hydrostatic pressure so that the various elements of flowable material making up the continuous seal are caused to flow together under pressure.

A suitable material for the sealing elements is a flexible substantially non-compressible rubber or rubber-like material. Resilient vulcanized rubber compositions are suitable for many sealing purposes in accordance with the present invention and when confined and placed under pressure have certain of the characteristics of a liquid. That is to say, they are substantially non-compressible in the sense that they have substantial resistance to having their volume reduced when placed under pressure but the material flow to fill up all voids in the confined space. For applications requiring resistance to chemicals or oils or grease, various of the synthetic rubbers known to the art or mixture of such synthetic rubbers or with natural rubber are suitable. Neoprene in flexible, resilient form is particularly suitable when mineral oils are likely to come into contact with the sealing material. For relatively high temperatures, heat resistant flowable plastic material such as silicone compositions may be employed.

In general, in the preferred type of sealing structure of the present invention, the actual sealing contact is made between the edge of a plate or sheet and the surface of a flexible sealing element such as discussed above while the mechanical stresses are transmitted through contacting surfaces on the metallic or other materials from which the main portions of the structures are fabricated. The invention, however, involves a novel joint structure even in the absence of the sealing elements and certain features of the joint structures of the present invention may be employed effectively without the sealing elements for containers such as storage bins for solids where absolute prevention of leakage is not required. That is to say, the flowable sealing material may be omitted or replaced by non-flowable sealing elements. For example, sealing elements made of such materials as woven asbestos may be employed where extremely high temperatures are likely to be encountered. In addition to the fabrication of containers, the joint structure of the present invention is useful in the fabrication of large diameter pipe for liquids and gases, and may be employed for air ducts, chimneys, etc.

It is therefore an object of the present invention to provide an improved demountable structure which may be employed to provide leak proof containers, large diameter pipes, etc.

Another object of the invention is to provide an improved demountable structure involving a joint construction in which a resilient flowable sealing material extends continuously throughout all of the connected joints in the structure and is placed under pressure.

Another object of the invention is to provide a demountable structure having a joint construction in which a flexible flowable sealing material is substantially completely confined within the walls of the joint and is placed under pressure to force adjacent elements of such material to flow into sealing contact with each other and the surfaces to be sealed together.

A further object of the invention is to provide demountable shipping containers which may be easily assembled into leak proof receptacles and which may be easily disassembled for return to point of shipment.

A still further object of the invention is to provide a novel joint structure which may be employed to fabricate various types of sheet material into leak proof tanks, pipes, storage bins, shipping containers, etc.

Other objects and advantages of the invention will appear in the following description thereof and illustrated in the attached drawings, of which:

Fig. 1 is a side elevation of a tank in accordance with the present invention;

Fig. 2 is an end elevation of the tank of Fig. 1;

Fig. 3 is a fragmentary vertical section taken on the line 3—3 of Fig. 1;

Fig. 4 is a view similar to Fig. 3 taken on the line 4—4 of Fig. 2;

Fig. 5 is a fragmentary horizontal section taken on the line 5—5 of Fig. 2;

Fig. 6 is a view similar to Fig. 3 showing a modified joint structure in partially disassembled condition;

Fig. 7 is a side elevation of the structure of Fig. 6 with the sealing bar removed;

Fig. 8 is a view similar to Fig. 5 further illustrating the structure of Figs. 6 and 7;

Fig. 9 is a view similar to Fig. 5 showing a modified end joint structure;

Fig. 10 is a vertical section taken on the line 10—10 of Fig. 9;

Fig. 11 is a fragmentary vertical section showing a further modified end joint structure;

Fig. 12 is a view similar to Fig. 11 showing another modification of an end joint structure;

Fig. 13 is an elevation of a shipping container employing the end joint of Fig. 12;

Fig. 14 is a view similar to Fig. 11 showing one way of terminating the seal for an open end tank or container;

Fig. 15 is a fragmentary vertical section showing a further modified joint structure;

Fig. 16 is a side elevation of a large diameter pipe made up of sections;

Fig. 17 is a fragmentary elevation illustrating how the structure of Fig. 16 may be employed to produce a tank;

Fig. 18 is a bottom plan view of a clamping plate employed in Fig. 16;

Fig. 19 is a view similar to Fig. 18 showing an end sealing plate employed in Fig. 17;

Fig. 20 is a fragmentary vertical section on the line 20—20 of Fig. 16;

Fig. 21 is a fragmentary isometric view of a corner of a plate of a pipe or tank element such as employed in Figs. 16 and 17;

Fig. 22 is an isometric view of a rectangular open top tank employing the joints of Figs. 18 to 21, inclusive;

Fig. 23 is an elevation of a large sized tank also employing the joint structure of Figs. 18 to 21;

Figs. 24 and 25 are partial vertical sections illustrating how tank bulkheads may be incorporated into joints of the present invention;

Figs. 26 and 27 are partial vertical sections illustrating modified joint structures particularly suitable for light weight sheet material;

Figure 35:
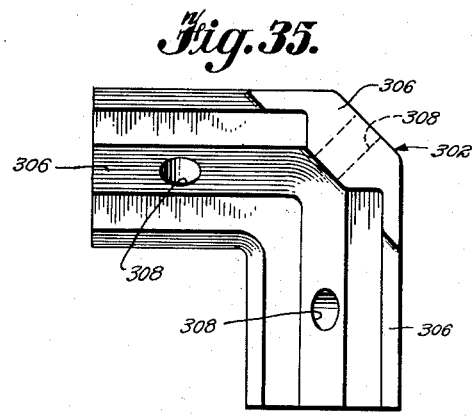
Figure 36:
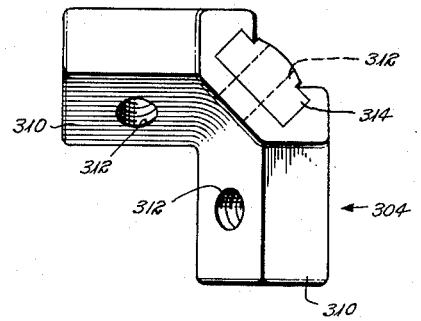
Figure 37:
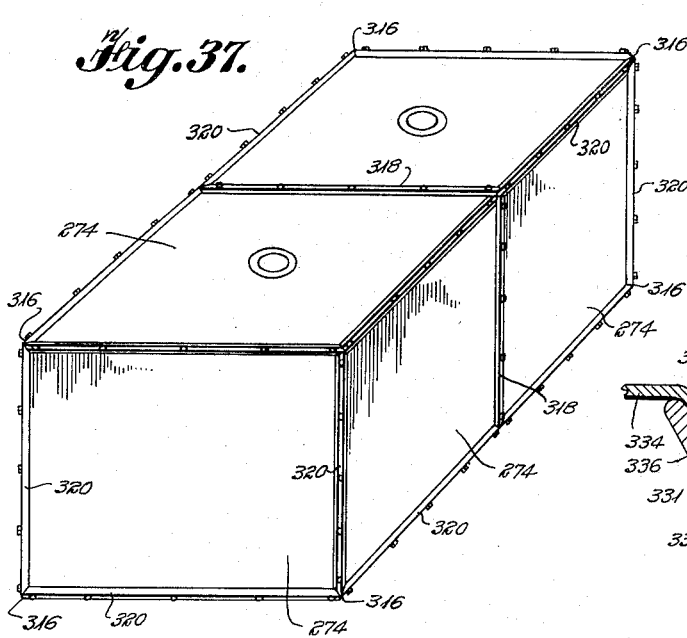
Figure 38:
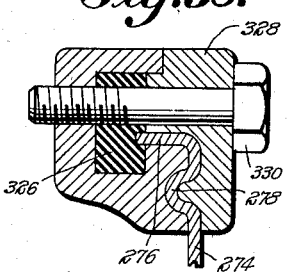
Figure 39:
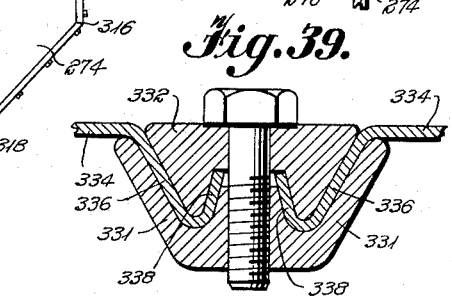

Figs. 28 to 30, inclusive, are fragmentary vertical sections illustrating one manner of fabricating the sealing bar of Figs. 26 and 27;

Fig. 31 is a fragmentary vertical section of a corner joint structure;

Fig. 32 is a view similar to Fig. 31 showing a modified joint structure;

Fig. 33 is a view similar to Fig. 31 showing a modified corner joint structure;

Fig. 34 is an isometric view of a rectangular tank structure in accordance with the present invention employing the corner joint of Fig. 31;

Figs. 35 and 36 are elevations of a corner clamping element and a corner sealing element, respectively, employed in the structure of Fig. 34;

Fig. 37 is an isometric view of a rectangular tank employing the joint structures of Figs. 32 and 33;

Fig. 38 is a fragmentary vertical section of a reinforcing structure for the upper peripheral edge of an open topped tank;

Figs. 39 to 42, inclusive, are fragmentary vertical sections illustrating further modified joint structures;

Fig. 43 is a side elevation of a modified tank structure;

Fig. 44 is a fragmentary sectional view taken on the line 44—44 of Fig. 43;

Fig. 45 is a view similar to Fig. 44 taken on the line 45—45 of Fig. 43;

Fig. 46 is a view similar to Fig. 44 taken on the line 46—46 of Fig. 43;

Figs. 47 to 50, inclusive, are fragmentary sectional views illustrating further modifications of sealing joint structures;

Fig. 51 is an end elevation of a modified shipping drum;

Fig. 52 is a side elevation of the drum of Fig. 51;

Fig. 53 is a fragmentary sectional view taken on the line 53—53 of Fig. 51;

Fig. 54 is a side elevation of the two heads of the drum of Figs. 51 and 52 attached together for shipping; and Fig. 55 is an end elevation showing the side sections of the drum of Figs. 51 and 52 nested for shipment.

Referring more particularly to the drawings, the tank 60 of Figs. 1 and 2 may include two semicircular side sections 61 and 62 secured together at diametrically opposite points by longitudinal joint structures 63. The tank 60 may also include end walls 64 secured to the sections 61 and 62 by joint structures indicated at 65.

The tank may also be provided with one or more outlets or pipe fixtures 66.

The longitudinal joint 63 is shown on a large scale in Fig. 3. The tank sections 61 and 62 are provided with flanged longitudinal edges providing an inwardly extending flange 67 having a return bent portion 68. The flange 67 is received in grooves 69 in a clamping bar 70 and is compressed into the grooves 69 by a sealing bar 71. The sealing bar 71 may be formed of sheet metal and may have a back portion 72 having its edges formed into longitudinally extending flanges 73 provided with a return bent portion 74. The flanged portions 73 are formed to fit within the groove in the flanges of the tank sections 61 and 62 provided by the longitudinal flanges 67 thereon and the return bent portions 68. The flanges on the sealing bar 72 provide a partially closed channel in which is positioned a sealing element 76 which may be flexible, substantially non-compressible rubber. The clamping bar 70 and sealing bar 71 may be clamped together by machine screws 78 screw threadedly engaging complementary threads in the clamping bar 70. It will be noted that the edges of the return bent portions 68 of the flanges on the tank sections 61 and 62 press into the rubber sealing element 76.

A suitable end seal structure between the tank sections 61 and 62 and the end sections 64 is illustrated in Figs. 4 and 5. As shown in Fig. 4, the end section 64 may have its edge portion rolled around a reinforcing wire 80 so as to provide a reinforcing portion 81. The edge portion may then extend radially inwardly of the end element 64, then axially inwardly of the tank and may terminate in a radially outwardly extending portion 82, to provide an annular groove 83 for the reception of an annular sealing element 84 of flexible, substantially non-compressible rubber. As also shown in Fig. 4, the ends of the semi-circular tank sections 61 and 62 may be provided with a circumferentially extending rib 86. The rib 86 extends inwardly of the tank sections 61 and 62 so as to be engaged by the portion 82 of the end sections 64. The extreme ends of the tank sections 61 and 62 are flanged inwardly at 90 so as to extend partially around the reinforcing portion 81 of the periphery of the end section 64 to retain the end section 64 in position between the flange 90 and the rib 86. As shown in Figs. 1 and 5, the ribs 86 terminate short of the longitudinal joint structure 71 while the flanged portion 90 of the tank sections 61 and 62 continues into abutting relationship, as shown in Fig. 1.

Fig. 5 is a fragmentary longitudinal vertical section through the joint structure 71 and the end section 64. It will be noted that the rubber sealing element 76 of the joint structure 71 has its end in contact with the side surfaces of the sealing element 84. The portion 82 of the end section 64 has a notch 92 formed therein, as shown in Figs. 3 and 5, to receive the clamping bar 70 such that the end of the clamping bar 70 substantially closes the notch 92 in the portions 88.

In assembling the tank of Figs. 1 to 5, the ends of clamping bars 70 are first placed in the notches 92 of the end sections 64. The semi-circular tank sections 61 and 62 are then placed on the framework thus provided so that the flanges 67 thereof enter into the grooves 69 in the clamping bars 70. The sealing bars 71 carrying the screws 78 are then placed in position and the screws 78 are then threaded into the clamping bars 70 and tightened. When the screws 78 are tightened the flanges 67 of the tank sections 61 and 62 are drawn into the grooves 69 to tighten the tank sections 61 and 62 around the end section 64 such that the end flanges 90 on the sections 61 and 62 engage the reinforcing portions 81 on the end sections to clamp the end sections between the flanges 90 and the portions 81. As tightening of the screws 78 is continued, the end sections 64 are cammed inwardly by the flanges 90 and both the sealing member 84 and the sealing member 76 are placed under pressure such that the sealing member 84 is tightly pressed against the interior surfaces of the sections 61 and 62. The sealing element 76 abuts against the sealing element 84 and flows longitudinally under pressure to form a substantially continuous flexible seal. Furthermore, the return bent sections 68 of the flanges 67 on the sections 61 and 62 are pressed into the flexible sealing element 76 as shown most clearly in Fig. 3. A continuous seal of flexible flowable material confined on all sides by metal walls and extending longitudinally of the joint structure 63 and circumferentially around the ends of the tank is thus provided. The flowable material flows into and fills the voids in the sealing channels and exerts resilient sealing pressure against the walls thereof while the mechanical stresses are transmitted through the joints by the metal members of the joint structure.

Fig. 6 shows a modification of the longitudinal joint structure. This figure shows the elements of the joint in partially assembled position. As in Fig. 3, the tank sections 61 and 62 are provided with longitudinally extending edge flanges 67 having return bent portions 68. The sections 61 and 62 are also provided with the ribs 86. The clamping bar may also be the same as that employed in Fig. 3 but a modified type of sealing bar 94, which may be an extruded section, is illustrated. Also the notch in the end section 96 is provided with a struck out supporting portion 98 also shown in Fig. 8 for supporting the clamping bar 70 during assembly of the tank sections. The sealing bar 94 of Fig. 6 may also be provided with an insert of flexible sealing material 100 and it will be apparent that tightening of the screw 78 will cam the flanged sections 67 of the semi-circular tank sections 61 and 62 down into the grooves 69 to tighten the ends of the sections 61 and 62 around the end sections 96 and cause the edges of the return bent portions 68 to be forced into the sealing element 100. The sealing joint of Fig. 6 is quite similar to the sealing joint of Fig. 3 and these two figures may be considered together as showing how tightening of the screws 78 cams the tank sections forming the peripheral walls of the tank into sealing engagement with the end sealing element 84 of Figs. 4 and 5.

A modified type of end seal, which may be employed with the longitudinal seal shown in either Fig. 3 or 6, is illustrated in Figs. 7 and 8. In these figures, the end section 96 has a peripheral reinforcing rib 102 rolled around a reinforcing wire 104. A retainer ring 106, also shown in Fig. 6, for the end sealing element 108 may be secured to the end section 96 in any suitable manner, for example, by spot welding. The ends of the semi-circular tank sections 110 and 112 may be provided with annularly extending inwardly directed ribs 114 which are pressed into the annular sealing element 108 when the tank is assembled.

The tank sections 110 and 112 may also be provided with ribs 86 as shown in Fig. 7 against which the retainer ring 106 for the sealing element 108 abuts in the same manner as the portion 82 shown in Fig. 4 abuts the ribs 86. The sections 110 and 112 are also provided with the end flanges 90 which partially surround the reinforcing rib 102 of the end section 96 for retaining the end sections in position. The structure of Figs. 6 to 8, inclusive, has the advantage that a supporting lip or struck out portion 98 is provided for supporting the clamping bar 70 during assembly of the tank and that the rib 114 presses into the flowable sealing material of the sealing element 108 when the tank is assembled to provide an improved seal.

A modified end seal is shown in Fig. 9. This end seal may be employed with any of the arcuate sections making up the cylindrical walls of the tank such as the sections 61 and 62 of Fig. 1 or the sections 110 and 112 of Figs. 7 and 8. The seal of Fig. 9 is illustrated in connection with an arcuate tank section such as the section 61 of Fig. 1 having the inwardly extending rib 86 and the end flange 90. The end section 116 of Fig. 9 may be provided with an annular flange member 118 suitably secured to the end section, for example, by spot welding. A clamping ring 120 may surround the flange member 118 and cooperate with the end section 116 to provide an annular recess for receiving a flowable sealing member 122. A series of machine screws 124 disposed about the periphery end section 116 may extend through this end section and into screw threaded engagement with the clamping ring 120. After the tank has been assembled the screws 124 may be tightened to apply additional pressure to the sealing member 122. This more securely seals the entire tank structure since the sealing member 122 tends to flow into the channels in the sealing bars such as bar 70 of Fig. 3 or the bar 94 of Fig. 6 to apply increased pressure to the sealing elements therein. As shown in Fig. 10, the clamping ring 120 of Fig. 9 may be provided with a notch 126 to receive clamping bars such as the clamping bars 70 of Figs. 3 and 6.

In Fig. 11 a removable end section or head 128 is illustrated, such removable end section being useful, for example, for shipping containers for solid material. The end section 128 is employed in connection with the modified arcuate tank sections 130 having an inwardly directed rib 86 adjacent its end but having its extreme end formed into a rolled reinforcing rib 132. The end sections 128 may have a retaining ring 106, of the type shown in Figs. 6 and 8, spot welded thereto to provide an annular groove for the reception of a sealing element 84 which may be of the same type as the sealing element shown in Fig. 4. The end section 128 may be dished, as illustrated in Fig. 11, and may be provided with a reinforcing ring 138 held in position by the inwardly extending rib 136. The end section 128 may be inserted into the tank or container after the same has otherwise been completely assembled and may be secured in position by the machine screws 140 extending radially inwardly through the arcuate sections 130 and received in the screw threaded apertures in the reinforcing member 138.

The end seal structure of Fig. 11 may be employed with either of the longitudinal joint structures shown in Figs. 3 and 6 and the end screws 78 shown therein will ordinarily not be completely tightened before the end section 128 is inserted. That is to say, the screws 78 will be sufficiently tightened to prevent leakage from the longitudinal seams and then when the end section 128 has been inserted and secured in position, the end screws 78 (Figs. 3 and 6) will be tightened to cause the flowable sealing elements of the longitudinal joint to flow against the sealing element 84 of Fig. 11 and place this sealing element also under compression. The sealing element 84 may be slightly larger in diameter than the inner diameter of the section 130 against which it abuts and also the ends of the sections 130 may be slightly flared outwardly to assist in inserting the end section 128.

Fig. 12 is a fragmentary vertical cross section through an end seal showing an end section 142 which is dished and provided with a filler opening closed by a cap 144. The end section 142 may be provided with a peripheral stiffening rib which may be the same as the rib 102 of Fig. 8 and may also be provided with a retainer ring 106 of the same type as that also shown in Fig. 8, the retainer ring being spot welded or otherwise secured to the end section 142 and providing a groove for the sealing element 84 which may be of the same type as the sealing element 84 of Fig. 4. An arcuate tank section 146 also shown in Fig. 13 may have an end flange 90 of the same type as shown in Figs. 4 and 5 partially surrounding the reinforcing rib 102 on the end section 142 and may also be provided with the inwardly directed rib 86, of the type shown in Figs. 4 and 11. Each of the arcuate sections 146 may also have sectional reinforcing members 148 secured thereto, for example, by spot welding or tack welding. If desired, more than two arcuate sections 146 may be employed and the tank shown in Fig. 13 employs three such sections each extending approximately 120° around the container.

The container shown in Fig. 13 may have the same end seal structure at both ends and both end seal structures may be protected by the reinforcing members 148. The arcuate sections 146 may be provided with outwardly projecting reinforcing ribs 150 formed therein and may also have reinforcing sections or roller rings 152 suitably secured thereto, for example, by welding. The sealing bars 154 may have the same cross-section as the sealing bar 94 of Fig. 6 and the entire longitudinal joint including the sealing bar 154 may otherwise have the same structure as that shown in Fig. 6 except that the sealing bars 154 may have blocks 158 secured to their outer surfaces to form continuations of the roller rings 152. The container of Fig. 13 is particularly suitable for a demountable shipping container or shipping drum for liquid materials. The ends of the shipping drum are reinforced by reinforcing members 148 and are further protected by the roller rings 152 formed on the arcuate sections 146.

If a container having an open end is desired, Fig. 14 illustrates one manner in which the longitudinal sealing structure may be terminated at such open end. In Fig. 14, a sealing bar 160, which may have the same cross-section as the sealing bar 94 of Fig. 6, may be employed with a clamping bar 162 which may have the same cross-section as the clamping bar 70 of Fig. 6. The sealing bar 160 may contain a sealing element 164 of flowable flexible material and the outer wall 166 of the sealing bar 160 may have an extending portion bent inwardly so as to cover the end of the sealing element 164. If desired, a reinforcing ring 170 having an angle iron cross-section may extend around the periphery of the open end of the container and be secured thereto in any suitable manner, for example, by metal cutting screws 172. The portion 168 enables the clamping screws 78 to be tightened to place the sealing element 164 under compression without causing extrusion of the sealing element through an open end of the sealing bar 160. That is to say, the sealing element 164 is substantially completely surrounded by metal walls.

Fig. 15 illustrates a longitudinal joint of the same general type as that shown in Fig. 6 but shows the elements reversed so that the joint itself is positioned on the exterior of a container or other structure so as to present a smooth surface on the interior of the container or other structure. The joint of Fig. 15 is particularly useful in structures such as shown in Figs. 16 and 17. Thus Fig. 16 illustrates a large diameter pipe made up of arcuate sections 174 joined at both their longitudinal edges and their end edges. Referring again to Fig. 15, the sections 174 may have their edges provided with outwardly extending flanges 176 having return bent portions 178. As illustrated in the fragmentary isometric view of Fig. 21, the flanges 176 may extend around all edges of the sections 174, Fig. 21 illustrating a corner of such a section. The joint shown in Fig. 15 may also be provided with an outer clamping bar 180 having substantially the same cross-section as the clamping bar 70 of Fig. 6 and may also be provided with an inner sealing bar 182 which has substantially the same cross-section as the sealing bar 94 of Fig. 6. However, both the clamping bar 180 and the sealing bar 182 of the joint of Fig. 15 may be provided with bores for receiving a flat headed machine screw 184 provided with a nut 186 for clamping the sealing bar 182 and clamping bar 180 together. The longitudinal joints in the pipe of Fig. 15 are thus made up of the clamping bars 180 and the sealing bars 182. The joints securing the arcuate ends of the sections 174 together may have the same cross-section as that shown in Fig. 16, but it will be understood that the clamping bar 188 and corresponding sealing bars will be arcuate in longitudinal sections to correspond to the curvature of the arcuate sections 174.

At the junction of the longitudinal joints and circumferential joints, clamping plates 190 of the type shown in Figs. 16 and 18 may be employed. These clamping plates 190 may be provided with four extending arms 192, all of which may have a cross-section the same as the cross-section of the clamping bar 180 of Fig. 15. Such clamping plates 190 will be employed with inner sealing plates 191 (Fig. 20) provided with four corresponding arms each having a cross-section the same as that of the sealing bar 182 of Fig. 15. A sealing plate 194 such as is shown in Fig. 19 may be employed in an end joint such as the joint employing a clamping plate 196 illustrated in Fig. 17 when it is desired to construct a tank or other container with the sections 174 of Fig. 16. That is to say, an end section 198 may be joined to the sections 174 of Fig. 16. By employing two end sections such as sections 198 a closed tank can be fabricated.

Fig. 20 is a fragmentary horizontal section taken on the line 20—20 of Fig. 16. This figure shows the clamping bars 180 and the sealing bars 182 provided with a sealing element 199. It also shows the clamping plate 190 cooperating with a sealing plate 191 provided with a sealing element 200. This view illustrates the fact that the sealing element 200 of the sealing plate 191 abuts the ends of the sealing element 199 of the sealing bars 182 so that in effect a continuous seal of flowable flexible material extends throughout all of the joints in the structure. As explained below, the clamping plates 190 and 196 as well as sealing plates 191 and 194 may be eliminated and the various clamping and sealing bars of the longitudinal and circumferential joints extended and mitered together so as to reduce the number of separate members required.

Fig. 22 illustrates how a large rectangular tank may be constructed employing the joint structures of Figs. 16 to 21 but with the various sealing and clamping bars mitered at their intersections. The vertical walls of the rectangular tank may be made up of side sections 202 and vertical corner sections 204 joined by vertically extending joint structures 206 which may be the same in cross-section as the joint shown in Fig. 15. Lower horizontal corner sections 208 may be provided and also three-way corner sections 210 where the two side walls and the bottom of the tank structure come together. It will be understood that the side sections 202 have flanges 176 (Fig. 21) extending around three sides thereof and that various corner sections have such flanges 176 extending around all four sides. It will be further understood that the bottom of the tank may be provided with appropriate sections having flanges extending around all four sides. The corner sections 208 as well as the corner sections 210 may be secured to the side sections 202 and the corner sections 204, respectively, by horizontal joint structures 212 which may also have a cross-section the same as that shown in Fig. 15. At the junctions of the horizontal and vertical joints, the sealing bars 182 (Fig. 15) with their sealing elements 199 and clamping bars 180 may have mitered ends as indicated in Fig. 22. This provides for abutting relationship between the sealing elements 199 (Fig. 15) so that pressure applied by tightening the nuts 186 is transmitted to all of the sealing elements in the various interconnected joints in the tank as will be discussed in greater detail with respect to a similar joint structure shown in Fig. 46. A structure similar to that shown in Fig. 14 can be employed for closing the upper ends of the sealing channels in the vertical joints of Fig. 22.

Large scale circular tanks such as illustrated in Fig. 23 may also be fabricated from side wall sections 214 having horizontal joint structures 216 which may be of the same type as the horizontal joint structures 212 of Fig. 22 and vertical joint structures 218 which may be of the same type as the vertical joint structures 206 of Fig. 22. Appropriate top and bottom corner sections 219 and 220, respectively, may be provided and it will be understood that suitable top and bottom sections (not shown) will also be provided. At the intersections 222 of the various joints the sealing bars and clamping bars may be mitered together as described with reference to Fig. 22. In this connection, it is noted that the various joints need not necessarily cross at right angles and the various sealing bars and clamping bars may be appropriately mitered. In all of the various structures illustrated sealing elements of flexible flowable material effectively extend continuously throughout the entire joint system and the sealing and clamping bars provide reinforcing or stiffening members for the wall sections.

Fig. 24 illustrates a manner of employing the joint structure of the present invention to provide bulkheads in tank structures. Such a tank may be made up of wall sections 224 having end flanges 226 received within grooves in a cast or forged bulkhead structure 228. A sealing bar which may be the same as the sealing element 94 of Fig. 6 may be employed to clamp the flanged sections 226 between the sealing bar 94 and the bulkhead 228. A similar structure is shown in Fig. 25, wherein a double bulkhead made of two sheet metal bulkhead sections 230 is illustrated. The bulkhead sections may have peripheral flanges 232 provided with return bent portions 234. The flanges 232 are received in grooves in a clamping bar 236. The flanges 226 of the tank sections 224 are received in the grooves formed by the flanges 232 of the bulkhead sections 230, the sealing bars 238 being secured in position by screws 240 which engage threaded bores in the clamping elements 236. Fig. 25 thus shows a manner of providing leak-proof double bulkheads in tanks such as those employed to deliver fuel oil, gasoline, etc.

Figs. 26 and 27 show modifications of the joint structure of the present invention particularly suitable for light sheet metal. For example, sections 242 of a light sheet metal container may be provided with return bent flanges 244 received within grooves formed in a clamping bar 246 also formed of light sheet metal. A sealing bar 248 may be provided with a sealing element 250 and the sealing element may be secured to the clamping element 246 by means of metal cutting screws 252. The clamping bar 246 may easily be formed by a rolling or die pressing operation and one manner of forming the sealing bar 248 is illustrated in Figs. 28 to 30, inclusive. Thus a channel member 254 may first be formed and a rectangular sealing element 250 placed therein. The flanges of the channel member 254 may then be rolled into the form shown in Fig. 29 so that the edges of the flanges extend inwardly at substantially right angles and a final rolling operation may bend the edges of the channel member into the form shown in Fig. 30 to produce the sealing bar 248. The joint structure of Fig. 27 is similar to that of Fig. 26 and employs the sealing bar 248 and the container sections 242. The clamping bar 256 differs from the clamping bar 246 of Fig. 26 in that it is provided with apertures through which a machine screw 258 freely extends. An auxiliary clamping bar 260 may be provided with screw-threaded apertures for receiving the machine screws 258 for clamping the joint structure together.

Fig. 31 illustrates another modification of a joint structure particularly suitable for corner joints. Sections 262 are provided with flanges 264 bent rearwardly so as to extend at an angle of approximately 45° to the plane of sections 262. Clamping bars 266 and the sealing bar 268 are formed to fit the edge portions of the sections 262. The clamping bar 266 and the sealing bar 268 are clamped together by a screw 270 to press the edges of the sections 262 into the sealing element 272.

Fig. 32 illustrates another modification of the joint structure of the present invention. In this figure the sections 274 are provided with flanges 276 bent at right angles to the planes of the sections and are provided with locking and stiffening ribs 278 adjacent the flanges 276. A sealing bar 280 containing a sealing element 282 is provided with a groove for receiving the ribs 278 and are otherwise shaped to conform to the shape of the edges of the sections 274. A clamping bar 284 is also provided and has ridges 286 received in the grooves provided by the ribs 278 of the sections 274 so as to enable the clamping bar to securely clamp the edges of the sections to the sealing bar. A machine screw 280 extends through the clamping bar 284 and is threaded into the sealing bar 280 to force the edges of the flanges 276 into the sealing element 282.

Fig. 33 illustrates a joint similar to the joint of Fig. 32 but adapted to be used as a corner joint. The tank sections 274 may be the same as those employed with the joint of Fig. 32 and may have flanges 276 and ridges 278. The sealing bar 288 and clamping bar 290 have, however, been modified so that the two sections extend at right angles to each other.

Fig. 34 illustrates a form of rectangular tank which may utilize the type of corner joint shown in Fig. 31. Such tank is made up of side sections 292, end sections 294 and top sections 296. It will be understood that bottom sections similar to top sections 296 will also be provided. All of the sections 292, 294 and 296 may have all of their edges formed with flanges similar to the flanges 264 of the sections 262 of Fig. 31. The intersections of the various edge joints 298 at a corner 300 may be formed by employing clamping plates 302 and sealing plates 304 of the type shown in Figs. 35 and 36. As stated above the edge joints 298 may be of the type shown in Fig. 31 employing an outer clamping bar 266. The clamping plate 302 of Fig. 35 may be provided with three similar arms 306 all extending at right angles to each other and all having the same cross-section as the clamping bar 266 of Fig. 31 and all provided with bores 308 for receiving the bolts 270 of Fig. 31. Similarly, the arms 310 and the sealing member 304 all have a cross-section of the same form as the sealing bar 268 of Fig. 31 and are provided with screw-threaded bores 312. The sealing plate 304 is provided with a sealing element 314 of flexible flowable material extending throughout all of the arms thereof. It will be apparent, however, that instead of employing the clamping plates 302 and sealing plates 304 of Figs. 35 and 36, respectively, the clamping bars 266 and sealing bars 268 of Fig. 31 may be mitered together to provide substantially the same appearance of the corners 316 of the tank of Fig. 37. The joint of Fig. 31 is not, however, well adapted to intermediate joints between adjacent flat sections such as the joints 318 of Fig. 37 and in tanks such as shown in Fig. 37, the joints of Figs. 32 and 33 are preferred.

In the tank of Fig. 37 the edge joints 320 may be of the type shown in Fig. 33 while the intermediate joints 318 may be of the type shown in Fig. 32. All of the various tank sections 274 may have all of their edges provided with exactly similar flanges 276 (Fig. 32), the ridges 278 assisting in preventing the sections from being forcibly pulled out of the joint structures. It will be found that the sealing bars 280 of Fig. 32 and the sealing bars 288 of Fig. 33 will miter together at both the corners 316 (Fig. 37) and intermediate intersections 322 to provide abutting engagement of the ends of the sealing elements 282. Appropriate clamping plates and sealing plates similar to those shown in Figs. 35 and 36 may, however, be employed for the corners 316 and intermediate sections 322 if desired to also provide abutting engagement between the various flowable sealing elements.

A tank similar to the tank of Fig. 37 may also be constructed with an open top and the structure of Fig. 38 may be employed to terminate the vertical joints. The structure of Fig. 38 may have a sealing bar 324 having a portion fitting the flange and ridge 278 of the section 274 and a portion containing a sealing element 326 of flowable material. It may also have a clamping bar 328 also having a portion fitting the flange 276 and ridge 278 of the section 274, the sealing bar 324 and clamping bar 328 being secured together with a bolt 330 threaded into a bore in the sealing bar 324. The sealing bars 324 can be mitered to fit the sealing bars 280 of Fig. 32 or sealing bars 288 of Fig. 33 so that the ends of the various flowable sealing elements are in engagement with each other.

Figure 40:
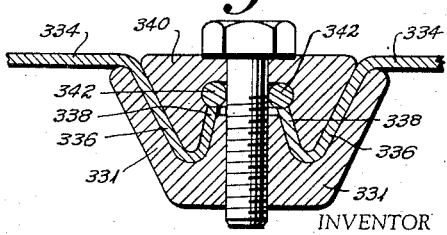
Figure 41:
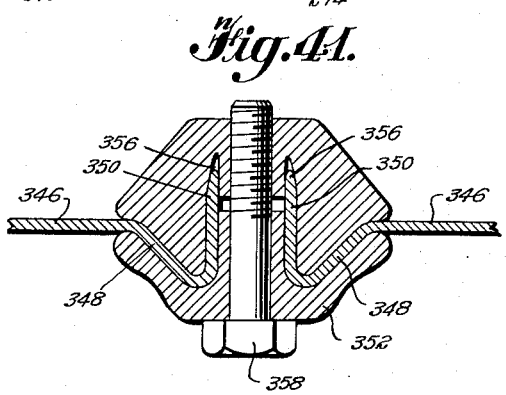

Although one of the most important features of the present invention is the employment of joint structures in which a flexible flowable sealing material extends continuously throughout all of the joints in the structure, the mechanical features of the present joint structure can be employed without employing the resilient flowable sealing material. Thus the joint of Fig. 39 has substantially the same construction as the joint of Fig. 6 except that the sealing element of resilient flowable material is omitted. This joint includes an internal clamping bar 331 having substantially the same form as the clamping bar 70 of Fig. 3 and an external clamping bar 332. The sections 334 to be joined together are provided with edge flanges 336 having return bent portions 338 received between the clamping members 330 and 332 to provide a mechanically strong joint. Such joints are suitable for storage bins and the like not required to be liquid or gas tight. The joint structure of Fig. 40 is similar to the joint structure of Fig. 39 and may employ the same type of internal clamping bar 331 to secure together the same type of sections 334. The outer clamping bar 340 may, however, be provided with a longitudinally extending groove in which wires 342 of malleable metal, such as lead or soft aluminum, are positioned. The ends of the return bent portions 338 of the flanges 336 are pressed into the soft metal wires 344 to improve the sealing efficiency of the joint structure. Another modification of a joint structure not employing a resilient flowable sealing material is shown in Fig. 41. In this figure, the sections 346 are provided with flanges 348 having reversely bent edge portions 350 extending substantially at right angles to the plane of the sections 346. An exterior clamping bar 352 having grooves fitting the flanges 348 is provided and an internal clamping bar 354 provided with longitudinal grooves 356 may be employed to clamp the flanges 348 against the clamping bar 354. The grooves 356 may receive the edge portions 350 converging inwardly, as shown in Fig. 41, so that the edge portions 350 are jammed into the grooves 356 when the screw 358 is tightened, to improve the sealing efficiency of the joint structure.

Fig. 42 illustrates a joint structure similar to that shown in Fig. 41 except that it is adapted for joining sections 360 meeting at right angles. The sections 360 have edge flanges 362 reversely bent so as to extend at an angle of approximately 45° to the plane of the sections 360 and the exterior clamping bar 364 is provided with longitudinal grooves fitting the edges of the sections 360. An internal clamping bar 366 fitting the sections 360 and flanges 362 is provided with longitudinal grooves 356 of the same type as those shown in Fig. 39 and it will be obvious that tightening of the screw 358 will jam the flanges 362 into the grooves 356 to improve the sealing efficiency of the joint.

Fig. 43 shows a modified sectional tank structure employing the sealing joints shown in Figs. 44 to 46, inclusive. The tank of Fig. 43 is shown as having four similar semicircular wall sections 368, although it is apparent that longer tanks may be provided with a large number of similar sections and that the sections may be less than semicircular in circumferential extent so that three or more sections are employed to complete the circumferential walls of the tank. The sections 368 have inwardly bent flanges 370 (Fig. 44) extending completely around their peripheries, the flanges 370 having return bent portions 372. The tank also has end sections 374 provided with inwardly bent flanges 376 extending completely around their peripheries and provided with return bent portions 378. The circumferential sealing joints 380 securing the end sections 374 to the wall sections 368 and the circumferential joint 381 securing the latter sections together intermediate the ends of the tank may all have the cross-section shown in Fig. 44 and also the longitudinal joints 382 may have the same cross-section.

The circumferential end joints 380 may have arcuate sealing bars 384 formed of heavy sheet metal so as to provide flange portions fitting the flanges 370 and 376 of the wall sections and end sections, respectively, and providing an internal channel containing a sealing element 385 of flowable resilient material. The end joint may also have an arcuate clamping bar 386 formed of heavy sheet metal and providing flanged portions which fit the reverse side of the flanges 370 and 376. The clamping bars 386 are provided with a plurality of screw threaded bores in which bolts 388 are received, the bolts 388 extending through bores in the sealing bar 384 and the sealing element 385. The intermediate circumferential joints 381 have the same structure as the end circumferential joints 380.

The longitudinal joints 382 may also have the same cross-section as the circumferential joints 380 and 381 and may be provided with straight sealing bars 390 and clamping bars 392. As shown in Figs. 43, 45 and 46, the sealing and clamping bars of the various joints may be mitered together at the intersections of the joints so that the sealing elements 378 of the circumferential joints abut the sealing elements 394 of the longitudinal joints in pressure transmitting relationship. In common with the joints previously described having flowable resilient sealing elements, tightening of the bolts 388 cams the various sections of the tank together and forces the edge portions of the peripheral flanges of the various sections into the sealing material. The sealing material is completely confined within metal walls and the pressure applied thereto causes this material to flow so as to exert pressure throughout the various intersecting joints. The walls of the sealing bars 380 and 382 shown in Figs. 43 to 46, inclusive, have considerable flexibility such that tightening of the bolts 388 may flex the walls of the sealing bars to a limited extent to apply further pressure to the sealing elements. Also in common with structures previously described, the tank of Fig. 43 may be repeatedly assembled and disassembled without impairing the efficiency of the seals when the tank is assembled.

Several modifications of other types of seals which may be employed for tank structures, containers, etc., are illustrated in Figs. 47 to 50, inclusive. In Fig. 47 the sealing bar 396 is of open channel formation and made of relatively heavy metal. It contains a sealing element 398 of flowable sealing material and the flanges 400 of the sealing bar are adapted to be received in grooves in sections 402 formed by reversely flanging the edges of the sections. The flanges 404 on the edges of the sections extend substantially at right angles to the plane of the sections 402 and have return bent portions 406 also extending substantially at right angles to the planes of the sections 402. A clamping bar 408 may be provided with edge flanges 410 fitting the exterior of the flanges 404 on the sections and a bolt 412 extending through a bore in the clamping bar 410 and threaded into the sealing bar 396 may be employed for securing the sections 402 together and applying sealing pressure to the sealing element 398. The sealing element 398 is forced into engagement with both the edges of the flanges 404 of the sections 402 and a portion of the sides of such flanges.

In the modification shown in Fig. 48 the sealing element 414 engages the side surfaces of the edges of the tank or container 416, such edges 418 being overlapped and having bores therethrough for receiving the bolt 412. The sealing bar 420 containing the sealing element 414 is of channel shape and has its edge flanges engaging in grooves provided by forming ribs 422 adjacent the edges of the sections 416. The clamping bar 424 may be of strap material fitting between the ribs 422 of the sections 416 and it is apparent that tightening of the bolts 412 which threadedly engage bores of the sealing bar 420 will apply pressure to the sealing element 414 to force it into engagement with the surfaces of the edges 418 of the sections 416.

In the modification of Fig. 49 the sealing bar 426 may be made of relatively thin sheet metal and provides a substantially closed body portion containing a sealing element 428 of resilient flowable material. The edges 430 of the body of the sealing bar 426 are bent outwardly and downwardly and are received in grooves provided by ribs 432 formed adjacent the edges of the sections 434 to be secured together. The sections 434 also have edge flanges 436 extending substantially at right angles to the planes of the sections, the flanges 436 being adapted to project into the body portion of the sealing bar 426 into contact with the sealing element 428. A clamping bar 438 having a central portion also extending partly into the body portion of the sealing bar may be provided and may have screw threaded bores for receiving the threaded end of bolts 412. It will be apparent that tightening of the bolts 412 will compress the body portion 426 of the sealing bar to compress the sealing element, this compression being facilitated by the openings 440 between the body portion of the sealing bar and the edge flanges 430 thereof.

Another modification of a joint in accordance with the present invention is shown in Fig. 50. In Fig. 50 the sealing bar 442 may be of channel section with diverging flange portions 444. A sealing element 446 of flowable, resilient material may be positioned within the channel of the sealing bar 442. The sections 448 to be joined together may have flanged portions 450 extending from the plane of the sections at substantially the same angle as the flanges 444 extend from the body of the sealing bar 442 and these flanges may have edge portions 452 extending in substantially the plane of the sections 448. A clamping bar 454 having a cross-section fitting between the flanges 450 of the sections 448 may be forced toward the sealing bar 442 by tightening of the bolt 412 so as to compress the portions 452 of the flanges 450 between the clamping bar 454 and the sealing element 446. In this modification also the sealing element 446 engages flat portions as well as edge portions of the sections 448 and is completely confined within metal walls so as to flow under pressure against sealing elements in intersecting joints.

The structure shown in Figs. 51 to 55, inclusive, represents an improved type of shipping drum involving a preferred type of sealing joint. These figures show a shipping drum made up of three similar arcuate sections 456 and two end sections 458 and 460. The arcuate sections 456 are provided with inwardly extending flanges 462 extending completely around their peripheries and having return bent portions 464. The end sections 458 and 460 are also provided with peripheral flanges 466 which extend inwardly and are provided with a return bent outwardly extending portion 468. The flanges 466 of the end sections have the same form as the flange 462 of the wall sections and the wall sections 456 are secured to the end sections or heads 458 by circumferential sealing joints 470. The sealing joints 470 include arcuate sealing bars 472 rolled from sheet metal. The sealing bars 472 have their edges rolled into double flanges 474 converging inwardly of the container and provided with return bent portions 476. The return bent portions 476 are spaced from the main portions of the flanges 474 and extend substantially parallel thereto into contact with the bottom of the channel formed by the flanges 474. A sealing element 478 of flexible flowable material is positioned in the resilient channel and it will be noted that the return bent portions 476 of the flanges 474 provide resilient elements enabling lateral expansion of the sealing element 478 when pressure is applied thereto.

The joints 470 also include an internal clamping bar 480 having edge flanges 482 providing grooves fitting the flanges 466 on the sections to be joined together. Tightening of the clamping bolts 484 which extend through bores in the sealing bars 472 into threaded bores in the clamping bars 480 cams the sections 456 and 458 and forces the edges of the return bent portions 464 and 468 of the flanges 462 and 466 into the sealing element 478. The circumferential joint 486 joining the other end section 460 to the arcuate wall section 456 may be identical with the joint 470.

The longitudinal joint 488 joining the longitudinal edges of the section 456 may also be the same as joints 470 just described except that the clamping bars and sealing bars are straight instead of being arcuate. Also the sealing bars of the joints 488 may be provided with arcuate cross-members 490 secured thereto in any suitable manner, for example, by spot welding, which arcuate cross members 490 form continuations of arcuate roller rings 492 secured to the arcuate sections 456 in any desired manner, such as by spot welding. The upper end or head section 458 may be dished, as illustrated in Fig. 53, and the same is true of the lower end section or head 460. Both end sections may be provided with annular reinforcing rings 494 as shown most clearly in Fig. 53 and the upper end or head section 458 may be provided with a filling and emptying opening, closed by a closure member 496.

The sealing and clamping bars at the intersection 498 of the circumferential and longitudinal joints are mitered together in a manner similar to that illustrated in Figs. 45 and 46 and it will be apparent that the shipping container may be easily assembled by merely fitting the various parts together and then tightening the bolts 484. By loosening the bolts of one of the circumferential joints 474 or 486, either end section or head may be removed and reapplied without otherwise disassembling the container.

When the container is disassembled, it occupies much less space than an assembled empty container. For example, as shown in Fig. 54, the two heads 458 and 460 may be secured together using the sealing bars and clamping bars of one of the circumferential joints, such as the circumferential joint 476. Since the heads are dished, there is sufficient room within the smaller package made by securing the heads together to contain the sealing and clamping bars and associated bolts of the other circumferential joint 486. The arcuate sections 456 of the shipping drum nest together, as shown in Fig. 55 and sufficient room is provided within the upper section 456 to receive the sealing and clamping bars of the longitudinal joints. A large number of shipping drums, such as illustrated in Figs. 51 to 55, inclusive, may be shipped in a relatively small space when disassembled and may easily be again assembled at the point of use. The shipping drums are reinforced by the sealing and clamping bars of the joints and also by the reinforcing rings 494 and the roller rings 492.

In all of the various modifications of the invention described above illustrating the employment of flexible flowable sealing material, this sealing material is confined completely within peripherally closed channels communicating with each other at the intersections of the joints to form a closed system of intersecting channels. The sealing material is placed under pressure analogous to hydrostatic pressure. The sealing material, in all cases, has sufficient cross-section, i. e., has sufficient width and thickness, and is sufficiently flexible that it will flow longitudinally of the closed channels so as to transmit the pressure from one sealing element to another in contact therewith. This transmission of pressure between sealing elements insures that any voids between the various sealing elements are completely filled so that no leakage can occur at the intersections of the various joints. Furthermore, the resilient flowable sealing material is pressed into intimate contact with the walls of the peripherally closed channels so as to fill all voids in the channels and provide effective sealing. In the preferred type of joints, the resilient flowable material is pressed against the edges of flanges on the members joined together.

Also in the preferred type of joints, any stresses such as tensile stresses tending to pull the joined sections apart are resisted by contact between flange surfaces on the sections and on the sealing and clamping bars. Thus, none of the tensile stresses caused by pressure in the various tanks or containers is resisted by the resilient flowable sealing material. Since the various clamping bars or clamping members and the various sealing bars or sealing members can be made of sufficient size to resist stresses greater than can be withstood by the sections joined together, the joint efficiencies may be made substantially 100%. That is to say, the joints are as strong or stronger than the material of the various sections joined together.

The flowable sealing elements may be of any flexible or resilient material which will flow under pressure but resists having its total volume decreased by such pressure. The preferred materials have the characteristics of relatively soft vulcanized rubber compositions having substantial resiliency and sufficient body to resist being forced out of the sealing channels through any small openings which may be present due to inaccuracies in the fabrication of the various wall sections, sealing bars, clamping bars, etc. As stated above, vulcanized natural rubber compositions have the requisite properties and the same is true of various synthetic rubber compositions or mixtures thereof or mixtures with natural rubber. The various oil resisting synthetic rubbers including neoprene may be employed for containers or other structures intended for use with mineral oils, and in general, the sealing material will be selected to resist attack by the substances likely to come in contact therewith.

As illustrated in the numerous figures presented, the principles of the joint structures of the present invention are applicable to a large number of structures including demountable or knock-down shipping containers, large tanks, storage bins, large pipes, chimneys, etc. It will be apparent that tanks may be provided with bulkheads and may be of the type employed for large scale storage of liquid or other materials or may be of the type employed on trucks for delivery of fluid products to customers. Also, the structures of the present invention lend themselves to the fabrication of demountable underground tanks, such as storage tanks or cesspools. The joint structures of the present invention may, however, also be employed for light weight containers such as those for paints, lubricating oils, etc., and may be employed for fabricating such structures as trash containers, garbage cans, etc. One of the major advantages of the present invention is that tanks and receptacles of all kinds, large pipes, etc., may be shipped in knocked-down or demounted condition and may be easily assembled at the point of use to provide leak-proof structures.

I claim:

1. In a sealing joint between adjacent edges of wall sections of a separable structure, said wall sections having transverse flanges at their edges, a sealing bar extending longitudinally of said joint and having a longitudinal channel therein, a strip of self-sustaining flexible sealing material in said channel, said flanges extending into said channel in spaced apart relation and in surface contact with the opposed sides of said channel, the edges of said flanges engaging said sealing material, and a clamping bar extending longitudinally of said joint, said clamping bar having portions engaging said wall sections adjacent said flanges and a pressure portion between said flanges in said channel, said pressure portion having a surface extending between said flanges in pressure engagement with substantially the entire surface of said sealing material between said flanges.

2. A joint as defined in claim 1, wherein the channel in said sealing bar is undercut outwardly of the edges of said flanges and wherein said strip of sealing material fills said undercut.

3. A joint as defined in claim 1, wherein said sealing bar is formed of sheet material with the channel therein defined by outer walls and return-bent flanges spaced from said outer walls and extending to the bottom of said channels to provide for limited lateral expansion of said strip of sealing material.

4. In a separable sealing joint between adjacent edges of wall sections of a separable structure, said wall sections having generally J-shaped flanges at their edges with the short legs thereof being the outermost edges of said sections, a sealing bar extending longitudinally of said joint and being of generally channel section with the legs thereof formed complementary to and positioned in the space between the legs of said J-shaped flanges with the short legs thereof extending into said channel in spaced apart relation, a strip of self-sustaining flexible sealing material filling the bottom of said channel and engaging the edges of the flanges therein, a clamping bar of generally W-shape formed complementary to and embracing the outer surfaces of said J-shaped flanges, the middle rib of said clamping bar extending into said channel between said flanges and having an inner surface extending between said flanges in pressure engagement with substantially the entire surface of said sealing strip between said flanges, and means for drawing said sealing and clamping strips together to confine and compress said sealing strip in said channel and against the edges of said flanges.

5. A joint as defined in claim 4, wherein said sealing strip is an incompressible but flowable rubber-like material.

6. A structure having walls comprising a plurality of wall sections, a plurality of intersecting sealing joints between said wall sections, each of said joints having separable elements securing edge portions of adjacent wall sections together, one of said elements having a channel extending lengthwise of said joint, means peripherally closing said channel, said means including edges of said adjacent wall sections, a separate sealing element of self-sustaining and substantially incompressible flexible resilient flowable material filling each of said channels and confined under pressure in each of said channels and in sealing engagement with said edges of said wall sections, said flexible material having a normal transverse sectional area greater than the transverse sectional area of said channels, said channels of said joints being in open communication with each other at the intersections of said joints and providing a closed system of channels, the ends of said sealing elements in said channels being in pressure transmitting but readily separable abutting engagement with the sealing element in an intersecting joint at said intersections whereby confinement thereof in said channels causes flow of said material lengthwise of said joint to provide a continuous seal throughout said intersecting joints.

CLYDE MAURICE MOORE.

References Cited in the file of this patent

UNITED STATES PATENTS

| Number | Name | Date |
|---|---|---|
| 222,450 | Brown et al. | Dec. 9, 1879 |
| 577,097 | Abrahams | Feb. 16, 1897 |
| 1,376,216 | Mittinger | Apr. 26, 1921 |
| 1,378,725 | Ryan | May 17, 1921 |
| 1,402,949 | Nichols et al. | Jan. 10, 1922 |
| 2,028,058 | Geyer | Jan. 14, 1936 |
| 2,249,106 | Baumgartl | July 15, 1941 |
| 2,402,253 | Macleod | June 18, 1946 |
| 2,447,065 | Goodwin | Aug. 17, 1948 |
| 2,545,481 | Maier | Mar. 20, 1951 |

FOREIGN PATENTS

| Number | Country | Date |
|---|---|---|
| 500,884 | Great Britain | Feb. 17, 1939 |